D. PIERCE.
Improvement in Clothes-Pins.
No. 5,041. Reissued Aug. 20, 1872.
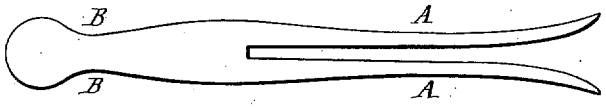
Witnesses
Harry Wellerman
Edmund Masson
Inventor.
Dexter Pierce
by G. H. Ford Atty
by A. L. Smith
Associate

UNITED STATES PATENT OFFICE.

DEXTER PIERCE, OF PAWLET, VERMONT.

IMPROVEMENT IN CLOTHES-PINS.

Specification forming part of Letters Patent No. 20,364, dated May 25, 1858; extended seven years; reissue No. 5,041, dated August 20, 1872.

*To all whom it may concern:*

Be it known that I, DEXTER PIERCE, formerly of Sunapee, county of Sullivan, State of New Hampshire, but now of Pawlet, county of Rutland, State of Vermont, have invented certain new and useful Improvements in Clothes Clamp or Pin, of which the following is a full, clear, and exact description, reference being had to the accompanying drawing making part of this specification.

I am aware that plain-turned pins, whether "headed" or otherwise, are open to several objections, among which is prominent the difficulty of making the limb of the pin light enough to be sufficiently yielding, and at the same time retaining the necessary size to afford the requisite strength. The main cause of this difficulty will at once appear when it is suggested that the pressure of the limbs of the pin apart is exceedingly unnatural, from the fact that the back or outside of each limb is in the form of an arc, and is consequently braced against the bend or spring required, the plain and well-known result being that the pin, on the least extra pressure upon the line, splits or parts in the middle, the fiber of the wood in the center of the pin giving way because the limbs fail to bend as they ought to do if they were properly constructed. It is also difficult to make such pins bite or clamp an article upon the line with a sufficient tenacity of grasp to retain it in position during a wind, on account of the undue rigidity of the cylindrical pin.

In order to obviate this objection I made this invention, which consists in making the legs or fingers of the pin flat upon both sides—that is, they are rectangular in cross-section instead of semicircular.

In the drawing I have shown one form of pin embodying my invention, in which the limbs A A retain an equality of thickness until near the inner end of the slit, where they are slightly enlarged to impart additional strength at the point where there is the greatest tendency to split. Another advantage growing out of the form shown is the convenience of being able to tell at once upon picking up a pin whether it is in proper position for placing upon the line. This is readily determined on account of the depressions at B B; but it is apparent that this feature is entirely independent of the superior elasticity incident to making the legs with parallel sides. Another point gained by this construction is the facility with which the pin can be manufactured, as the blanks can be dressed to the proper thickness and length. The slit and throat *a* can be cut in a number of pins in the same blank, when the separate pins can be cut off with a common circular saw.

Although I prefer to make the legs slightly concave on their outer faces, as shown, yet it is apparent that some if not all of the advantages incident to my construction may be obtained when said legs are made straight on both sides, except when the throat chamfer at *a* is cut.

I am aware that pins have been made from a single piece of wood both round and square in form, and having a series of slits in the head or butt, forming an elastic tongue or a series of tongues, which will spring so as to permit the legs of the pin to be spread when placed upon the line, the tension of the tongue or tongues serving to compress the legs, and thus retain the article in position. Hence I do not claim broadly a square pin with flat legs; but What I do claim is—

A wooden clothes-pin having a solid head and flat elastic legs adapted to clasp the line, substantially as described.

This specification signed and witnessed this 31st day of May, 1872.

DEXTER PIERCE.

Witnesses:

FAYETTE POTTER,

FANNY LOMBARD.